Feb. 5, 1952   H. KONET   2,584,472
END PLAY ADJUSTING ARRANGEMENT
Filed Aug. 25, 1949
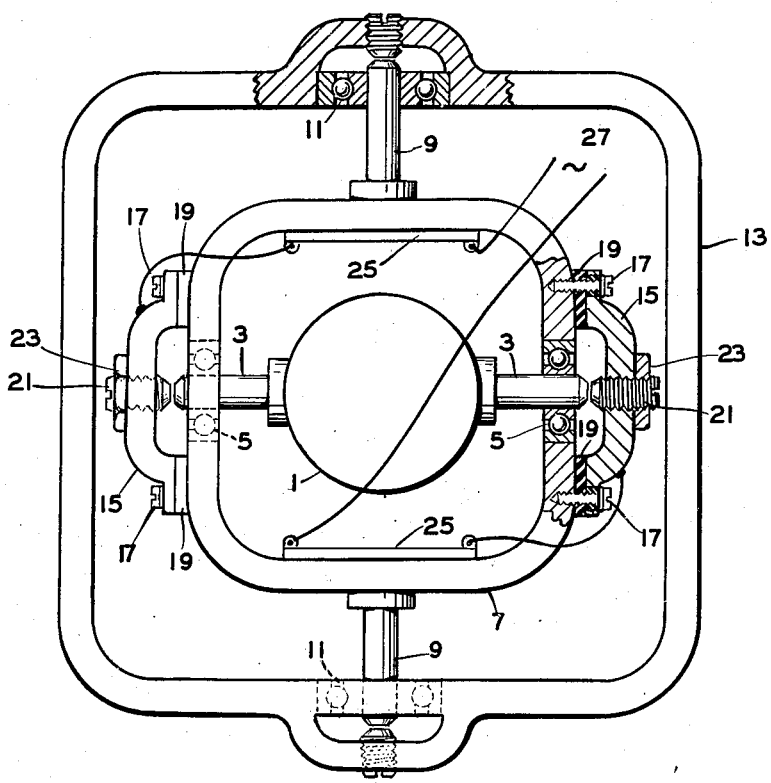
INVENTOR.
HENRY KONET
BY
ATTORNEY Patented Feb. 5, 1952

2,584,472

UNITED STATES PATENT OFFICE 2,584,472

END PLAY ADJUSTING ARRANGEMENT

Henry Konet, Hohokus, N. J., assignor to Bendix Aviation Corporation, Teterboro, N. J., a corporation of Delaware Application August 25, 1949, Serial No. 112,373

11 Claims. (Cl. 74—5)

1

The invention relates to indicating instruments, and more particularly to an instrument including relatively oscillating or rotating parts, such as in a gyroscope.

A gyroscope for use in aircraft instruments may have a gimbal of aluminum for light weight and a casing with pivots of hardened steel to resist wear. Since the thermal coefficient of expansion between aluminum and steel varies considerably, and since aircraft instruments are subject to a wide variation of air temperatures, an adjustment for end play of the gyroscope casing relative to the gimbal may be suitable for one temperature range, but may be unsuitable at temperatures above or below that range. Excess casing end play causes weight shift errors in the gyroscope, and insufficient casing end play causes precession errors due to friction.

One object of the present invention is to provide an instrument in which end play of an oscillating or rotating member is maintained substantially constant irrespective of the air temperature.

Another object is to provide proper end play of an oscillating or rotating member irrespective of nominal wear of associated parts.

Another object is to provide a gyroscope in which errors due to improper casing end play are avoided.

The invention contemplates a support mounting an oscillating or rotating member and having spaced elements engageable by the member for limiting its end play. A heater heats and thermally expands the support, when the heater is energized, to increase the distance between the elements. The heater is energized when the member engages the elements and is de-energized when the member disengages the elements.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for purposes of illustration and description only, and is not to be construed as defining the limits of the invention.

The single figure of the drawing shows a top view, partly in section, of a gyroscope constructed according to the invention.

The gyroscope includes a rotor casing 1, rotatable about mutually perpendicular axes, with pivots 3 supported for rotation in aligned ball bearing assemblies 5 mounted in a gimbal 7.

2

Gimbal 7 may be made of any suitable lightweight material, such as aluminum or magnesium, having a relatively large thermal coefficient of expansion, and pivots 3 may be made of any suitable wear-resistant material, such as hardened steel, having a relatively small coefficient of expansion. Gimbal 7 has pivots 9 extending at right angles to pivots 3 and supported for rotation in ball bearing assemblies 11 mounted in a housing 13.

End caps 15 are secured by screws 17 to gimbal 7 at the ends of casing pivots 3, and insulators 19 are interposed between the end caps and gimbal. An adjusting screw 21 is threaded into each end cap 15 for engaging the end of the associated pivot 3 to limit end play of the casing. Screws 21 preferably are adjusted to provide suitable end play of casing 1 at the maximum air temperature at which the device operates. Lock nuts 23 may be provided to maintain adjustment of the screws.

Heaters 25 are associated with the portions of gimbal 7 extending between bearings 5 and are energized to heat the gimbal so that the distance between screws 21 increases as the gimbal expands thermally. Heaters 25 are connected in series with end caps 15 and casing 1 to any suitable power source 27.

When the instrument operates at temperatures tending to contract gimbal 7 relative to casing 1 and reduce end play of casing 1, pivots 3 engage both screws 21 and heaters 25 are energized by current flowing from power source 27 through the heaters, end caps 15, adjusting screws 21 and casing 1. Gimbal 7 is heated until it expands thermally sufficiently to provide enough end play of the casing for the casing pivots to disengage one or the other adjusting screw 21, whereupon current flow to the heaters is interrupted. The gimbal may then cool and contract again until the casing pivots engage both adjusting screws and complete the heater circuit and the cycle of operation will repeat.

After proper end play of the casing relative to the gimbal is provided initially by adjusting screws 21, proper end play will be maintained irrespective of change in temperature at which the device operates and irrespective of nominal wear of casing pivots 3 and adjusting screws 21. By maintaining proper end play of the rotor casing relative to the gimbal, weight shift errors due to excess end play and precession errors due to insufficient end play are avoided.

A similar heater arrangement may be provided on housing 13, if desired, but such arrangement is believed unnecessary because proper end play of the gimbal in the housing is not so critical as proper end play of the rotor casing in the gimbal because the housing may be mounted substantially rigidly in the craft in which the gyroscope is used and is not affected by weight shift of the rotor casing, whereas the gimbal is free to rotate in the housing and is affected by weight shift of the casing.

Although but one embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. In combination, a support, a member mounted in said support for rotation relative thereto, elements on said support abutting the ends of said member and limiting end play of the member relative to the support, and means associated with said support for heating and thermally expanding said support to increase the distance between said elements, said means being energized when said member engages said elements and being de-energized when said member disengages one of said elements.

2. In combination, a support, a member mounted in said support for rotation relative thereto, spaced elements associated with said support and engageable by said member, a heater arranged to heat said support when said heater is energized to thermally elongate said support and increase the distance between said elements, said heater, said elements and said member being connected in series so that said heater is energized when said member engages said elements and is de-energized when said member disengages one of said elements.

3. In combination, a support, a member rotatably mounted in said support, spaced elements on said support and engageable by said member to limit end play of said member relative to said support, means associated with said support to thermally expand said support and increase the distance between said elements, said means, said elements and said member being connected in series so that said heater is energized when said member engages said elements and is de-energized when said member disengages one of said elements.

4. In combination, a support having spaced axially aligned bearings, a member supported by said bearings for rotation relative to said support, spaced elements on said support engageable by said member to limit end play of said member relative to said support, at least one of said elements being adjustable to provide proper end play of said member relative to said support, and a heater associated with said support to thermally expand said support and increase the distance between said elements, said heater being energized when said member engages said elements and being de-energized when said member disengages one of said elements.

5. In combination, a support having spaced axially aligned bearings, a member having pivots mounted in said bearings for rotation relative to said support, end caps on said support electrically insulated therefrom and engageable with said pivots to limit end play of said member, a heater associated with said support to thermally expand said support when the heater is energized and increase the distance between said end caps, said heater being energized when said pivots engage said end caps and being de-energized when one of said pivots disengages the associated end cap.

6. In combination, a support, a member rotatably mounted in said support, end caps on said support electrically insulated therefrom, adjustable elements on said end caps engageable with the ends of said member to provide proper end play of said member, a heater associated with said support to thermally expand said support when the heater is energized and increase the distance between said elements, said heater being energized when said member engages said elements and being de-energized when said member disengages one of said elements.

7. In a gyroscope, a gimbal, a rotor casing mounted in said gimbal for rotation relative thereto, spaced elements associated with said gimbal and insulated therefrom and engageable by said casing to limit end play of said casing, a heater associated with said gimbal to thermally expand said gimbal when said heater is energized to increase the distance between said elements, said elements and said casing being connected in series so that said heater is energized when said casing engages said elements and is de-energized when said casing disengages one of said elements.

8. In a gyroscope, a gimbal having spaced axially aligned bearings, a rotor casing having pivots mounted in said bearings for rotation relative to said support, end caps secured to said gimbal at the ends of said pivots and insulated electrically from said gimbal, elements threaded into said end caps and abutting the ends of said pivots and adjustable relative to said end caps to vary the distance between said elements, heaters in thermal contact with the portions of said gimbal between said bearings and arranged to heat said gimbal when said heaters are energized to thermally expand said gimbal and increase the distance between said elements, said heaters, said end caps and said casing being connected in series so that when said pivots engage said elements, said heaters are energized and increase the end play of said casing, and when one of said pivots disengages the associated element, said heaters are de-energized and the distance between said elements and the end play of said casing decreases as said gimbal cools.

9. In a gyroscope, a gimbal of a material having a relatively high thermal coefficient of expansion, spaced axially aligned bearings in said gimbal, a rotor casing having pivots of a material with a thermal coefficient of expansion less than the material of said gimbal and rotatable in said bearings, end caps secured to said gimbal at the ends of said pivots and insulated from said gimbal, screw elements arranged to engage the ends of said pivots and aligned with said bearings and adjustable relative to said end caps to vary the distance between said elements, a heater associated with said gimbal for heating said gimbal when said heater is energized to thermally expand said gimbal and increase the distance between said elements and increase the end play of said casing, said heater, said end caps and said casing being connected in series so that when said pivots engage said elements said heater is energized, and when one of said pivots disengages the associated element said heater is de-energized and the distance between said elements and the end play of said casing decreases as said gimbal cools.

10. A gyroscope having a rotor and a casing rotatably supporting the rotor, a gimbal, means mounting said casing on said gimbal for oscillation about an axis perpendicular to the rotor spin axis, said mounting means and said gimbal being arranged to permit preselected end play for said mounting means and formed of material having different thermal coefficients of expansion whereby due to changes in ambient temperature affecting said gimbal and mounting means said end play is varied, and means responsive to said varied end play for counteracting the effect of said ambient temperature changes on said gimbal and mounting means.

11. In combination, a support, a member mounted in said support for rotation relative thereto, spaced elements associated with said support and engageable by said member to limit end play of the member relative to the support, and means associated with said support for thermally expanding said support to increase the distance between said elements, said means being operative when said member engages said elements, and being inoperative when said member disengages one of said elements.

HENRY KONET.

REFERENCES CITED

The following references are of record in the file of this patent:

UNITED STATES PATENTS

| Number | Name | Date |
|---|---|---|
| 2,180,136 | Bates | Nov. 14, 1939 |
| 2,422,267 | Summers | June 17, 1947 |